US007135519B2

(12) United States Patent
Atkinson et al.

(10) Patent No.: US 7,135,519 B2
(45) Date of Patent: Nov. 14, 2006

(54) GASKET COATING CONTAINING CHEMICALLY EXFOLIATED VERMICULITE

(75) Inventors: Alan William Atkinson, Nr Rugby (GB); Stephen Peter Bond, Rugby (GB); Darryl Alfred Turland, Ann Arbor, MI (US)

(73) Assignee: Federal-Mogul Technology Limited, Warwickshire (GB)

( * ) Notice: Subject to any disclaimer, the term of this patent is extended or adjusted under 35 U.S.C. 154(b) by 252 days.

(21) Appl. No.: 10/642,903

(22) Filed: Aug. 18, 2003

(65) Prior Publication Data
US 2005/0209386 A1    Sep. 22, 2005

Related U.S. Application Data

(63) Continuation of application No. 09/623,785, filed as application No. PCT/GB99/00491 on Feb. 15, 1999, now abandoned.

(30) Foreign Application Priority Data

| Mar. 10, 1998 | (GB) | ................................ 9804949.7 |
| Dec. 7, 1998 | (GB) | ................................ 9826737.0 |

(51) Int. Cl.
C04B 28/26 (2006.01)
F02F 11/00 (2006.01)
(52) U.S. Cl. ...................... 524/449; 524/442; 277/591; 277/592; 277/595; 428/66.4
(58) Field of Classification Search ................ 277/591, 277/592, 594, 595; 524/442, 449, 450; 428/66.4; 413/19
See application file for complete search history.

(56) References Cited

U.S. PATENT DOCUMENTS

| 4,169,916 A | 10/1979 | Tsutsui et al. |
| 4,379,857 A * | 4/1983 | Hansen et al. ................. 521/54 |
| 4,425,465 A * | 1/1984 | Padget et al. ................ 524/450 |
| 4,477,094 A | 10/1984 | Yamamoto et al. |
| 4,961,989 A | 10/1990 | Grimwood |
| 5,255,483 A | 10/1993 | Agrawae et al. |
| 5,322,299 A * | 6/1994 | Terai ........................... 277/596 |
| 6,093,467 A * | 7/2000 | Forry ......................... 428/66.4 |

FOREIGN PATENT DOCUMENTS

| DE | 3618786 | * 12/1987 |
| DE | 4405864 | 8/1995 |
| EP | 0075396 A | 3/1983 |
| GB | 2122699 A | 1/1984 |
| JP | 2-142859 | 5/1990 |
| JP | 5180344 | 7/1993 |

OTHER PUBLICATIONS

Machine Translation of JP 5180344.*
Manufacturers Data Sheet. Bentonite/Montmorillonite [online]. Bentonit Scientific Industrial Co. [retrieved on Sep. 29, 2005]. Retrieved from the internet: <URL:http://www.bentonit.ru/en/about_prod/bentonit>.*
Manufacturers Data Sheet. Silicone Rubber [online]. Reiss Manufacturing Inc. [retrieved on Sep. 29, 2005]. Retrieved from the internet: <URL:http://www.reissmfg.com/feature.htm>.*
Machine Assisted Translation of JP 05-180344.*
Translation of DE 3618786.*

* cited by examiner

Primary Examiner—Vasu Jagannathan
Assistant Examiner—Sandra Poulos
(74) Attorney, Agent, or Firm—Robert L. Stearns; Dickinson Wright, PLLC

(57) ABSTRACT

A sealing-enhancing coating for a gasket or a portion of a gasket includes flaky particles of chemically exfoliated vermiculite, at least 90% by weight of the particles having a thickness of no more than 30 microns, and no dimension greater than 1 mm. The particles form 10 to 90 wt. % of the coating. The coating also includes 50 to 10 wt. % of an organic polymer binder which when formed into a film 1 mm or less in thickness and heated to 300° C. in free air for 24 hours either does not decompose or decomposes leaving a residue of at least 20% by weight of film.

21 Claims, No Drawings

GASKET COATING CONTAINING CHEMICALLY EXFOLIATED VERMICULITE

This application is a continuation application of U.S. patent application Ser. No. 09/623,785, filed Oct. 27, 2000, now abandoned.

BACKGROUND OF THE INVENTION

1. Technical Field

This invention is concerned with a gasket coating. In particular, the invention is concerned with a gasket coating for application to a surface of a gasket to provide improved sealing by filling small cracks and fissures in the surface of the gasket and/or of the member against which the gasket seals.

2. Related Art

Gaskets are used for sealing between two members, e.g. two portions of the exhaust system of an internal combustion engine, and provide a seal around a passage which passes from one member to the other. Accordingly, a gasket has to be resilient in order to press against the members and provide a fluid-tight seal. In the case of an exhaust gasket, the seal is to prevent escape of exhaust gases and entry of air. The resilience can be provided by utilising a relatively thick layer of resilient material such as a resilient rubber-based material or graphite but, where high temperatures (above 300.degree. C.) are experienced such as in an exhaust system, many resilient materials would degrade and are not commonly used. Instead, the gasket comprises a sheet of metal, e.g. stainless steel, which is formed into resilient ridges (called "beads") which provide the seal. Thus, when such a gasket is clamped between two members, the clamping force compresses the beads which are resiliently deformed and press against the members along the lines of the beads. However, such gaskets normally do not provide as good a seal as is desirable because the beads are unable to enter into small cracks and fissures in the members so that gases and liquids can escape past the beads. It is known, in gaskets not utilised at such high temperatures as are experienced by exhaust gaskets, to provide metal beads with a thin coating (typically less than 200 microns in thickness) of a sealing-enhancing coating which will deform under clamping pressure to fill cracks and fissures. Known sealing-enhancing coatings, however, degrade at higher temperatures so that they cannot be used on, e.g., exhaust gaskets for internal combustion engines.

SUMMARY OF THE INVENTION

It is an object of the present invention to provide a sealing-enhancing coating which is suitable for use on a gasket or a portion thereof, e.g. exhaust gaskets or bore seals, which will experience high temperatures in service.

DETAILED DESCRIPTION OF THE PREFERRED EMBODIMENT

The invention provides a sealing-enhancing coating for a gasket or a portion of a gasket, characterised in that the coating comprises flaky particles of chemically exfoliated vermiculite, at least 90% by weight of said particles having a thickness of no more than 30 microns, and no dimension greater than 1 mm, the particles forming 10 to 90 wt % of the coating, the coating also comprising 50 to 10 wt % of an organic polymer binder which is heat resistant to at least 300.degree. C.

For the present purposes an organic polymer binder is considered to be heat resistant to a particular temperature if, when the binder is formed into a film 1 mm or less in thickness and heated to that temperature in free air for 24 hours, it either does not decompose or decomposes leaving a residue of at least 20% by weight of the film.

It is found that a coating according to the invention improves the sealing ability of gaskets which experience high temperatures in service, in particular gaskets with embossed sealing beads for example exhaust gaskets for internal combustion engines.

Chemically exfoliated vermiculite is a known heat-resistant resilient material which provides sealing and possibly binding properties at high temperatures (e.g. above 300.degree. C.). Exfoliated vermiculite is conventionally formed by expanding mineral vermiculite using gas. Chemically-exfoliated vermiculite (CEV) is a form of exfoliated vermiculite which is formed by treating the ore and swelling it in water. In one possible preparation method, the ore is treated with saturated sodium chloride solution to exchange magnesium ions for sodium ions, and then with n-butyl ammonium chloride to replace sodium ions with n-C.sub.4H.sub.9NH.sub.3 ions. On washing with water swelling takes place. The swollen material is then subjected to high shear to produce an aqueous suspension of very fine (diameter often below 50 microns) vermiculite particles.

It is known to utilise chemically-exfoliated vermiculite in a sealing layer, i.e. the layer which provides the sealing force by compression thereof, of a sheet gasket, e.g. an automotive head gasket. For example, GB 2 123 034 B describes making a flexible sheet material, e.g. for a gasket, by subjecting an aqueous suspension to electrophoresis. The suspension contains an expanded layer silicate, e.g. CEV with a particle size below 50 microns, and a dispersed organic polymeric material, e.g. acrylic polymer, acrylonitrile-butadiene copolymer, epoxy resin, or natural rubber. However, these flexible sheet materials are not suitable for use as a sealing-enhancing coating on an exhaust gasket because the polymeric material would degrade at high temperatures and the coating would become less effective.

In a coating according to the invention, the polymer binder is preferably a silicon-containing polymer, e.g. a silicone resin or a siliconate. Also possible are PTFE, phenolics, and fluoroelastomers.

In order to improve the water-resistance of the coating, it is preferred that the coating contains more of the organic polymer binder by weight than of the chemically exfoliated vermiculite.

Preferably, a coating according to the invention also comprises a solid lubricant e.g. particle as of graphite, molybdenum disulphide, hexagonal boron nitride, calcium difluoride, or PTFE (PTFE may also serve as a binder).

A coating according to the invention may also comprise a flaky filler, e.g. mica, milled thermally exfoliated vermiculite, or aluminium flake. A suitable selection of filler can enhance the drying of the coating after it is applied.

The coating also, preferably, comprises a supplementary inorganic binder/adhesion promoter, e.g. a water-soluble alkali silicate, especially lithium silicate.

Preferably, a coating according to the invention also comprises a waterproofing agent acting on at least one of the chemically exfoliated vermiculite and supplementary inorganic binders.

Preferably, none of the ingredients of a coating according to the invention should prematurely interact with one another. In particular, none of the ingredients should flocculate the CEV or precipitate the alkali silicate.

Preferably a coating according to the invention has a thickness of less than 100 microns, e.g. the thickness may be up to 80 microns, e.g. between 50 and 75 microns.

A coating according to the invention may be used on a bore seal or an embossed steel gasket sheet and is suitable for use in an exhaust gasket of an internal combustion engine.

In order to increase resilience, a coating according to the invention, preferably, has a density of below 70% of the theoretical density of the material forming the coating. More preferably the density of the coating is below 50% of said theoretical density.

The invention also provides a method of forming a gasket characterised in that the method comprises applying a coating according to the invention to at least a portion of a metal sheet, embossing the metal sheet with the coating to form at least one resilient ridge therein with the coating extending across said ridge, and heating the embossed sheet to a temperature of at least 350.degree. C. to temper said sheet. Preferably said metal sheet is made of stainless steel. The coating may be applied to both sides of the sheet, including possibly to both sides of the sheet in the region of the ridge, i.e. the coating borders the trough created in the other side of the sheet by the formation of a ridge.

There now follows a detailed description of three examples of sealing-enhancing coatings which are illustrative of the invention.

In order to form the first illustrative coating, the following were mixed together:

(a) 50 g of chemically-exfoliated vermiculite suspension (15% solids in water). This was obtained from W R Grace & Co under the designation Microlite HTS. The particles of CEV were flaky and had a size distribution such that at least 90% by weight had a thickness of no more than 30 microns and no dimension greater than 1 mm.

(b) 5 g of graphite flake particles (grade Hart 400 from Colin Hart Minerals). This graphite is milled so that 96% of the particles pass through a 37 micron sieve. These particles were included to provide a solid lubricant.

(c) 5 g of aluminium powder (grade Fine 24 from Ronald Britton & Co). The mean particle size of the aluminium is 16–24 microns with less than 1% being retained on a 160 micron sieve. This powder formed a water-proofing agent acting on the inorganic binder(s).

(d) 5 g of mica particles (SX 300 from Microfine Minerals). 1–4% of the mica particles are retained by a 20 micron sieve. The mica was included as an inorganic filler.

(e) log of methyl phenyl silicone resin emulsion (MP 42E from Wacker). This was a suspension in water at 42% solids and provided an organic polymer binder. This resin has an ignition point of 465.degree. C. This binder, when formed into a film 1 mm or less in thickness and heated to 300.degree. C. in free air for 24 hours decomposes leaving a residue of at least 20% by weight of the film, the residue being silica which has some binding properties.

(f) 5 g of lithium silicate solution (23% solids). This was obtained from Crossfield under designation L40 and provided an inorganic binder in addition to the organic binder provided by the silicone resin and the CEV. The lithium silicate takes over some of the binding function at higher temperatures (at which the silicone resin undergoes thermally-induced chemical changes). The lithium silicate may also promote bonding to steel substrates.

The mixture was sprayed onto the surface of a stainless steel sheet. The mixture was then dried forming a coating over one surface of the sheet having a thickness of approximately 50 microns. The coating had a density of between 0.7 and 0.8 g/cm.sup.3, the theoretical density of the material forming the coating being approximately 2.0 g/cm.sup.3.

Next, the sheet with the coating thereon was embossed to form sealing beads which were covered at their crests by the coating.

Next, the embossed coated sheet was heated to 350.degree. C. for one hour to temper the steel with the embossments; at coating in situ. The sheet was then incorporated in a multi-layer steel gasket. It was found that the coating performed well in micro-sealing.

In order to form the second illustrative coating, the following were mixed together:

(a) 200 g of chemically-exfoliated vermiculite particles as mentioned at (a) of the first example.

(b) 20 g of graphite flake particles as mentioned at (b) of the first example.

(c) 40 g of silicone resin as mentioned at (e) of the first example.

(d) 20 g of water.

The mixture of the second example was sprayed on to the surface of a stainless steel sheet, dried, embossed and tempered in the same way as is described above in relation to the first illustrative example.

In order to form the third illustrative example, the following were mixed together:

(a) 50 g of chemically exfoliated vermiculite as mentioned in the first example.

(b) 30 g of methyl silicone resin emulsion (M50 E from Wacker). This was a suspension in water at 50% solids and provided an organic polymer binder.

(c) 5 g of lithium silicate as disclosed in the first example.

(d) 5 g of graphite flake particles as disclosed in the first example.

(e) 5 g of mica particles as disclosed in the first example.

(f) 0.25 g of aluminium powder as disclosed in the first example.

(g) 30 g of water.

The mixture of the third example was sprayed, embossed, and tempered in the same way as the first two examples.

The gasket coatings formed by the first, second and third illustrative methods all gave enhanced sealing coatings which were capable of micro-sealing at temperatures above 300.degree. C.

The invention claimed is:

1. A metal gasket assembly having at least one embossed sealing bead and a gasket coating applied to the at least one bead comprising: chemically exfoliated vermiculite wherein at least 90 weight percent of the vermiculite has a thickness of less than or equal to 30 microns and no dimension is greater than 1 millimeter; a high temperature organic binder that is heat resistant to at least 300 degrees Celsius; a supplementary inorganic binder; and a flaky filler.

2. The gasket assembly of claim 1 wherein the exfoliated vermiculite is present in an amount from 10 to 90 percent by weight of the coating.

3. The gasket assembly of claim 1 wherein the high temperature organic binder is a silicone or siliconate resin.

4. The gasket assembly of claim 1 wherein the high temperature organic binder is present in an amount of from 10 to 50 percent by weight of the coating.

5. The gasket assembly of claim 1 wherein the supplementary inorganic binder is lithium silicate.

6. The gasket assembly of claim 1 wherein the flaky filler is mica, milled thermally exfoliated vermiculite, aluminum flake, or a mixture thereof.

7. The gasket assembly of claim 1, wherein the amount by weight percent of the high temperature organic binder is greater than the amount by weight percent of the chemically exfoliated vermiculite in the coating.

8. The gasket assembly of claim 1 wherein the coating has a thickness of less than 100 microns.

9. The gasket assembly of claim 1 wherein the coating has a thickness of less than 80 microns.

10. The gasket assembly of claim 1 wherein the coating has a thickness of from 50 to 75 microns.

11. The gasket assembly of claim 1 further comprising a solid lubricant.

12. The gasket assembly of claim 1, characterized in that the coating has a density of below 70% of the theoretical density of the material forming the coating.

13. A seal-enhancing coating for a gasket comprising a mixture of: chemically exfoliated vermiculite wherein at least 90 weight percent of the vermiculite has a thickness of less than or equal to 30 microns and no dimension is greater than 1 millimeter; a high temperature organic binder that is heat resistant to at least 300 degrees Celsius; a supplementary inorganic binder; and a flaky filler.

14. The coating of claim 13 wherein the exfoliated vermiculite is present in an amount from 10 to 90 percent by weight of the coating.

15. The coating of claim 13 wherein the high temperature organic binder is a silicone is a siliconate.

16. The coating of claim 13 wherein the high temperature organic binder is present in an amount of from 10 to 50 percent by weight of the coating.

17. The coating of claim 13 wherein the supplementary inorganic binder is lithium silicate.

18. The coating of claim 13 wherein the flaky filler is mica, milled thermally exfoliated vermiculite, aluminum flake, or a mixture thereof.

19. The coating of claim 13, wherein the amount by weight percent of the high temperature organic binder is greater than the amount by weight percent of the chemically exfoliated vermiculite in the coating.

20. The coating of claim 13 further comprising a solid lubricant.

21. A method of forming a metal gasket, comprising:

preparing at least one metal gasket sheet having at least one opening for conveying a fluid and at lest one embossment in the sheet defining a sealing ridge around the at least one opening operative to press against opposing members to be sealed to provided a primary seal around the at least one opening;

applying a seal-enhancing coating to the at least one metal gasket sheet such that the coating extends over the sealing ridge of the at least one embossment to improve the sealing characteristics of the at least one embossment by filling small cracks or fissures in the surface of the gasket and/or the member against which the gasket seals in operation, wherein the seal-enhancing coating is prepared from a mixture of chemically exfoliated vermiculite in which at lest 90 percent of the vermiculite has a thickness of less than or equal to 30 microns and no dimension is greater than 1 millimeter, a high temperature organic binder that is heat resistant to at least 300 degrees Celsius, a supplementary inorganic binder, and a flaky filter.

\* \* \* \* \*